US007957574B2

(12) United States Patent
Sirohey et al.

(10) Patent No.: US 7,957,574 B2
(45) Date of Patent: Jun. 7, 2011

(54) METHODS AND APPARATUS FOR GENERATING A RISK METRIC FOR SOFT PLAQUE IN VESSELS

(75) Inventors: Saad Ahmed Sirohey, Pewaukee, WI (US); Gopal B. Avinash, New Berlin, WI (US); John V. Skinner, New Berlin, WI (US); Sandeep Dutta, Waukesha, WI (US); Patricia Le Nezet, Le Pecq (FR); Deann Marie Haas, Port Washington, WI (US)

(73) Assignee: General Electric Company, Schenectady, NY (US)

( * ) Notice: Subject to any disclaimer, the term of this patent is extended or adjusted under 35 U.S.C. 154(b) by 1117 days.

(21) Appl. No.: 11/603,490

(22) Filed: Nov. 22, 2006

(65) Prior Publication Data

US 2008/0118122 A1   May 22, 2008

(51) Int. Cl.
G06K 9/00 (2006.01)
(52) U.S. Cl. ....................................................... 382/131
(58) Field of Classification Search .................. 382/100, 382/128, 129, 130, 131, 132, 133, 134, 173, 382/181; 378/1, 37, 21, 41, 42, 38, 44, 51, 378/62, 65, 146; 128/920; 600/300, 407
See application file for complete search history.

(56) References Cited

U.S. PATENT DOCUMENTS

| 6,347,247 | B1 * | 2/2002 | Dev et al. ........................ 607/2 |
| 7,123,766 | B2 * | 10/2006 | Mao et al. ..................... 382/154 |
| 2003/0190063 | A1 * | 10/2003 | Acharya et al. ............... 382/128 |
| 2004/0017936 | A1 * | 1/2004 | Gopinath et al. ............. 382/131 |
| 2004/0066958 | A1 * | 4/2004 | Chen et al. .................... 382/128 |
| 2004/0249270 | A1 * | 12/2004 | Kondo et al. .................. 600/425 |
| 2006/0050941 | A1 * | 3/2006 | Middleton et al. ............ 382/128 |
| 2006/0115137 | A1 * | 6/2006 | Knoplioch et al. ........... 382/131 |
| 2006/0241427 | A1 * | 10/2006 | Kinouchi et al. ............. 600/437 |
| 2007/0019846 | A1 * | 1/2007 | Bullitt et al. .................. 382/128 |
| 2007/0019850 | A1 * | 1/2007 | Knoplioch et al. ........... 382/131 |
| 2009/0279752 | A1 * | 11/2009 | Sirohey et al. ................ 382/128 |

OTHER PUBLICATIONS

Faber et al., "Three-Dimensional Fusion of Coronary Arteries with Myocardial Perfusion Distributions: Clinical Validation", Journal of Nuclear Medicine, vol. 45 No. 5 745-753, 2004.*
Faber et al., "Three-Dimensional Fusion of Coronary Arteries with Myocardial Perfusion Distributions: Clinical Validation", Journal of Nuclear Medicine, vol. 45 No. 5 745-753, Published May 2004.*
Alejandro F. Frangi, Wiro J. Niessen, Romhild M. Hoogeveen, Theo Van Walsum and Max A. Viergever. *Model-Based Quantitation of 3-D Magnetic Resonance Angiographic Images*. IEEE Transactions on Medical Imaging, vol. 18, No. 10, Oct. 1999, 10 pgs.
Rogers D. F., Adams J. A,"Mathematical Elements for Computer Graphics" second edition, McGraw Hill, 1990. ISBN 0-07-053529.

(Continued)

*Primary Examiner* — Bhavesh M Mehta
*Assistant Examiner* — Tahmina Ansari
(74) *Attorney, Agent, or Firm* — Dean Small; The Small Patent Law Group (57) ABSTRACT

A method for generating a score for soft plaque in coronary arteries includes using the computer to estimate the soft plaque content within at least one object depicted in a medical image, using the computer to determine a plaque score dependent upon the estimated soft plaque content of the at least one object, and using the computer to report the plaque score.

18 Claims, 8 Drawing Sheets

OTHER PUBLICATIONS

Laurent Saroul, Oscar Figueiredo, and Roger D. Hersch. Distance Preserving Flattening of Surface Sections, IEEE Transactions on Visualization and Computer Graphics, vol. 12, No. 1, Jan.-Feb. 2006, 10 pgs.

Eric Pichon, Allen Tannenbaum. *Curve Segmentation Using Direectional Information, Relation to Pattern Detection.* Georgia Institute of Technology, 4 pgs., Sep. 2005 ICIP.

Eric Pichon, Carl-Fredrik Westin and Allen Tannenbaum. *A Hamilton-Jacobi-Bellman approach to high angular resolution diffusion tractography.* Georgia Institute of Technology, Atlanta GA 30332, USA, 8 pgs., Oct. 2005 (MICCAI ' 05).

myrian® XP Hepatic, Pioneering the automatic detection of hepatic tissues. www.myrian.fr, 2 pgs., Nov. 2005.

* cited by examiner

METHODS AND APPARATUS FOR GENERATING A RISK METRIC FOR SOFT PLAQUE IN VESSELS

BACKGROUND OF THE INVENTION

This invention relates generally to imaging, and more particularly to determining the mass and the volume of soft matter in reconstructed images and, for medical images, determining a risk metric for a patient when the soft matter is soft plaque.

Configurations of the present invention are particularly useful in medical and diagnostic computed tomographic (CT) applications for quantification of calcification and/or lesions, but the present invention is not limited to medical applications or to CT.

In some known CT imaging system configurations, an x-ray source projects a fan-shaped beam which is collimated to lie within an X-Y plane of a Cartesian coordinate system and generally referred to as an "imaging plane". The x-ray beam passes through an object being imaged, such as a patient. The beam, after being attenuated by the object, impinges upon an array of radiation detectors. The intensity of the attenuated radiation beam received at the detector array is dependent upon the attenuation of an x-ray beam by the object. Each detector element of the array produces a separate electrical signal that is a measurement of the beam intensity at the detector location. The intensity measurements from all the detectors are acquired separately to produce a transmission profile.

In third generation CT systems, the x-ray source and the detector array are rotated with a gantry within the imaging plane and around the object to be imaged such that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector.

In an axial scan, the projection data is processed to construct an image that corresponds to a two-dimensional slice taken through the object. One method for reconstructing an image from a set of projection data is referred to in the art as the filtered backprojection technique. This process converts the attenuation measurements from a scan into integers called "CT numbers" or "Hounsfield units" (HU), which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighing algorithms that weight the collected data as a function of view angle and detector channel index. Specifically, prior to a filtered backprojection process, the data is weighted according to a helical weighing factor, which is a function of both the gantry angle and detector angle. The weighted data is then processed to generate CT numbers and to construct an image that corresponds to a two-dimensional slice taken through the object.

To further reduce the total acquisition time, multi-slice CT has been introduced. In multi-slice CT, multiple rows of projection data are acquired simultaneously at any time instant. When combined with helical scan mode, the system generates a single helix of cone beam projection data. Similar to the single slice helical, weighting scheme, a method can be derived to multiply the weight with the projection data prior to the filtered backprojection algorithm.

Cardiovascular related deaths constitute more that 500000 annually in the USA, and much more globally, according to the American Heart Association. A major portion of them is attributed to coronary artery disease, where the chief culprit is the build up of plaque, specifically soft-plaque and its ruptures. In x-ray or non-contrasted CT, soft plaque is not easily detectable. Calcified plaque has been used as a surrogate for the presence of soft plaque on the basis that calcified plaque is the by product of ruptured plaque. Coronary plaque has been classified into 6 stages according to the Stary scale. According to general consensus, it is crucial to determine plaque in stages 4 and 5 as such plaque merits the critical label "vulnerable plaque." Vulnerable plaque can lead to plaque rupture or dislodging, causing blockages that lead to myocardial infarction (MI). The so-called "gold standard" for determining plaque and its constituency is intravascular ultrasound (IVUS), however, IVUS is only performed on symptomatic patients due to its invasive nature. Symptomatic patients are already at an advanced stage and past non-invasive therapy options.

With the arrival of cardiac volume computed tomography (cardiac VCT) and its ever increasing spatial and temporal resolution and the impending arrival of high definition (HD) cardiac VCT, it has become possible to image a contrasted study of the heart gated to mitigate heart motion. Using these images, it is possible to distinguish plaque from vessel and from calcification, however it is still not possible to do so in an automated manner to assist in standardization and to achieve productivity improvements for radiologists and cardiologists.

BRIEF DESCRIPTION OF THE INVENTION

In one aspect, some configurations of the present invention provide a method for generating a score for soft plaque in coronary arteries. The method includes using the computer to estimate the soft plaque content within at least one object depicted in a medical image, using the computer to determine a plaque score dependent upon the estimated soft plaque content of the at least one object, and using the computer to report the plaque score.

In another aspect, some configurations of the present invention provide a machine-readable medium or media having instructions recorded thereon configured to instruct a computer to generate a score for soft plaque in coronary arteries. The instructions include instructions configured to instruct the computer to estimate the soft plaque content within at least one object depicted in a medical image, determine a plaque score dependent upon the estimated soft plaque content of the at least one object, and to report the plaque score.

In yet another aspect, some configurations of the present invention provide a medical imaging apparatus having a radiation source, a detector array, an image processor, a display, and a memory. The medical imaging apparatus is controlled by a computer that is configured to operate the medical imaging apparatus to produce medical images using the radiation source, the detector array, the image processor, the display, and the memory. The memory has stored therein instructions configured to instruct the computer to generate a score for soft plaque in coronary arteries. These instructions include instructions configured to instruct the computer to estimate the soft plaque content within at least one object depicted in a medical image, determine a plaque score dependent upon the estimated soft plaque content of the at least one object, and to report the plaque score.

It will be appreciated that some configurations of the present invention provide a determination and display of at least a plaque score and, in some configurations, a severity state and/or a vulnerability index, all of which are based on a volumetric medical image of a patent. The determined and displayed scores are useful for noninvasively determining the health of an organ such as a patient's heart.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments of the present invention in which data representing an image is generated but a viewable image is not. However, many embodiments generate (or are configured to generate) at least one viewable image.

The recitation of a single object or action is not intended to exclude configurations involving plural said objects or said actions from the scope of a claim, unless it is explicitly recited otherwise. For example, a claim reciting the action "identifying a region of exclusion" without further qualification as to number is intended to include within its scope configurations in which a plurality of regions of exclusion are identified.

Technical effects of the present invention include, but are not limited to, the use of a medical image to determine and display a plaque score and, in some configurations, a severity state and/or a vulnerability index, all of which are useful for noninvasively determining the health of an organ such as a patient's heart. As used herein, unless referring to an image actually being displayed, the scope of the subject matter referred to by the term "image" is also intended to include data representing an image, i.e., an image in a form useful for processing by a computer.

Figure 1:
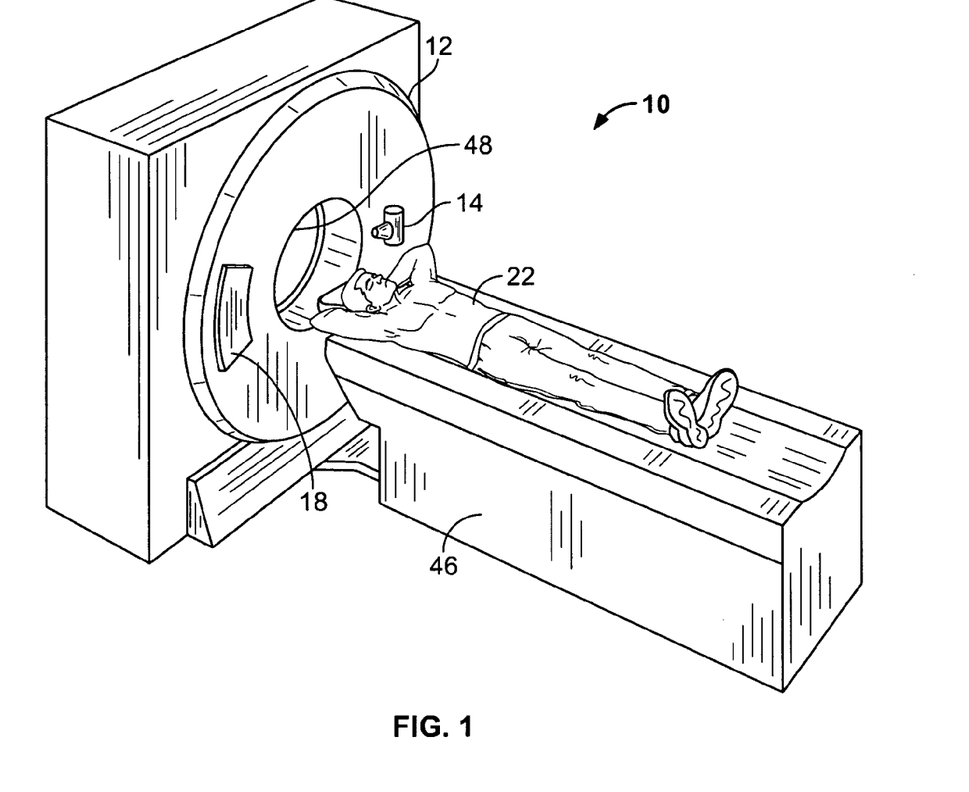
FIG. 1 is a pictorial drawing of a configuration of a computed tomographic (CT) imaging system of the present invention.
Figure 2:
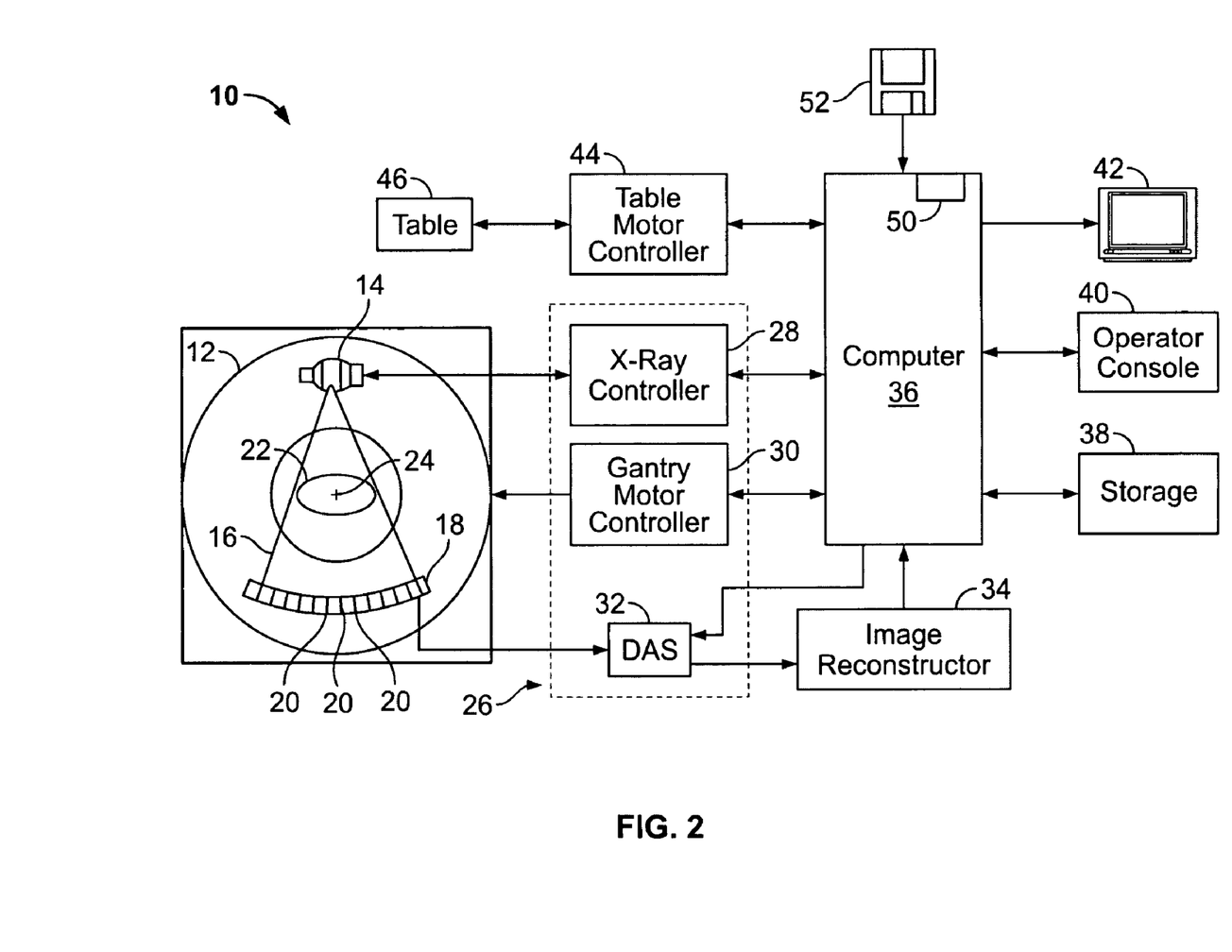
FIG. 2 is a schematic block diagram of the CT imaging system of FIG. 1.

Referring to FIGS. 1 and 2, a multi-slice scanning imaging system, for example, a Computed Tomography (CT) imaging system 10, is shown as including a gantry 12 representative of a "third generation" CT imaging system. Gantry 12 has an x-ray tube 14 (also called x-ray source 14 herein) that projects a beam of x-rays 16 toward a detector array 18 on the opposite side of gantry 12. Detector array 18 is formed by a plurality of detector rows (not shown) including a plurality of detector elements 20 which together sense the projected x-rays that pass through an object, such as a medical patient 22 between array 18 and source 14. Each detector element 20 produces an electrical signal that represents the intensity of an impinging x-ray beam and hence can be used to estimate the attenuation of the beam as it passes through object or patient 22. During a scan to acquire x-ray projection data, gantry 12 and the components mounted therein rotate about a center of rotation 24. FIG. 2 shows only a single row of detector elements 20 (i.e., a detector row). However, multi-slice detector array 18 includes a plurality of parallel detector rows of detector elements 20 such that projection data corresponding to a plurality of quasi-parallel or parallel slices can be acquired simultaneously during a scan.

Rotation of components on gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of components on gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36, which stores the image in a storage device 38. Image reconstructor 34 can be specialized hardware or computer programs executing on computer 36.

Computer 36 also receives commands and scanning parameters from an operator via console 40 that has a keyboard and/or other user input and/or marking devices, such as a mouse, trackball, or light pen. An associated display 42, examples of which include a cathode ray tube (CRT) display, liquid crystal display (LCD), or plasma display, allows the operator to observe the reconstructed image and other data from computer 36. Display 42 may include a user pointing device, such as a pressure-sensitive input screen. The operator supplied commands and parameters are used by computer 36 to provide control signals and information to DAS 32, x-ray controller 28, and gantry motor controller 30. In addition, computer 36 operates a table motor controller 44, which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Although the specific embodiment mentioned above refers to a third generation CT system, the methods described herein equally apply to fourth generation CT systems (stationary detector—rotating x-ray source) and fifth generation CT systems (stationary detector and x-ray source). Additionally, it is contemplated that the benefits of the invention accrue to imaging modalities other than CT. Additionally, although the herein described methods and apparatus are described in a medical setting, it is contemplated that the benefits of the invention accrue to non-medical imaging systems such as those systems typically employed in an industrial setting or a transportation setting, such as, for example, but not limited to, a baggage scanning system for an airport or other transportation center.

Density D, volume V, and mass m of an object are related by the relationship m=DV. CT imaging produces a value in Hounsfeld units for a voxel representative of an average density of a unit volume defined by the size of the unit voxel, δxδyδz. The density of the voxel is determined by filtered backprojections of multiple rays that indicate an amount of absorbed photons in the unit volume. (For simplicity, the effect of multiple wavelengths and other approximations in reconstruction algorithms are not considered, but reconstruction filters, field of view i.e., FOV, and slice thickness are considered.) Thus, the voxel value is an average density of the volume of the voxel, and the average density is in turn related to the amount and composition of matter in that volume. If the unit voxel volume δxδyδz is occupied by a metal, then the matter in this volume may be dense and absorb most of the radiation passing through it, resulting in a high number of Hounsfield Units (HUs). If the unit volume contains a mixture of two components, for example, calcium and water, the volume will absorb photons in proportion to the amounts of the components in the mixture. The HU of a voxel is thus an estimate of the average density of matter in the voxel volume, provided that there is no signal corruption or noise.

In prior art configurations, an algorithm to determine mass and volume of calcification relies upon the relationship $$m = CV_\tau(\mu_c - \mu_w),$$

where m is the mass, C is the calcium calibration correction, $\mu_c$ is the mean density of the thresholded volume $V_\tau$, where $\tau$ is a calibrated, user-defined threshold (for example, if a user selects 130 as the threshold, then $\tau=C\times130$), $\mu_w$ is a mean density value for water, and volume $V_\tau$ is determined by multiplying the number of voxels greater than $\tau$ by the dimension of the voxel, $\partial x \partial y \partial z$.

Figure 3:
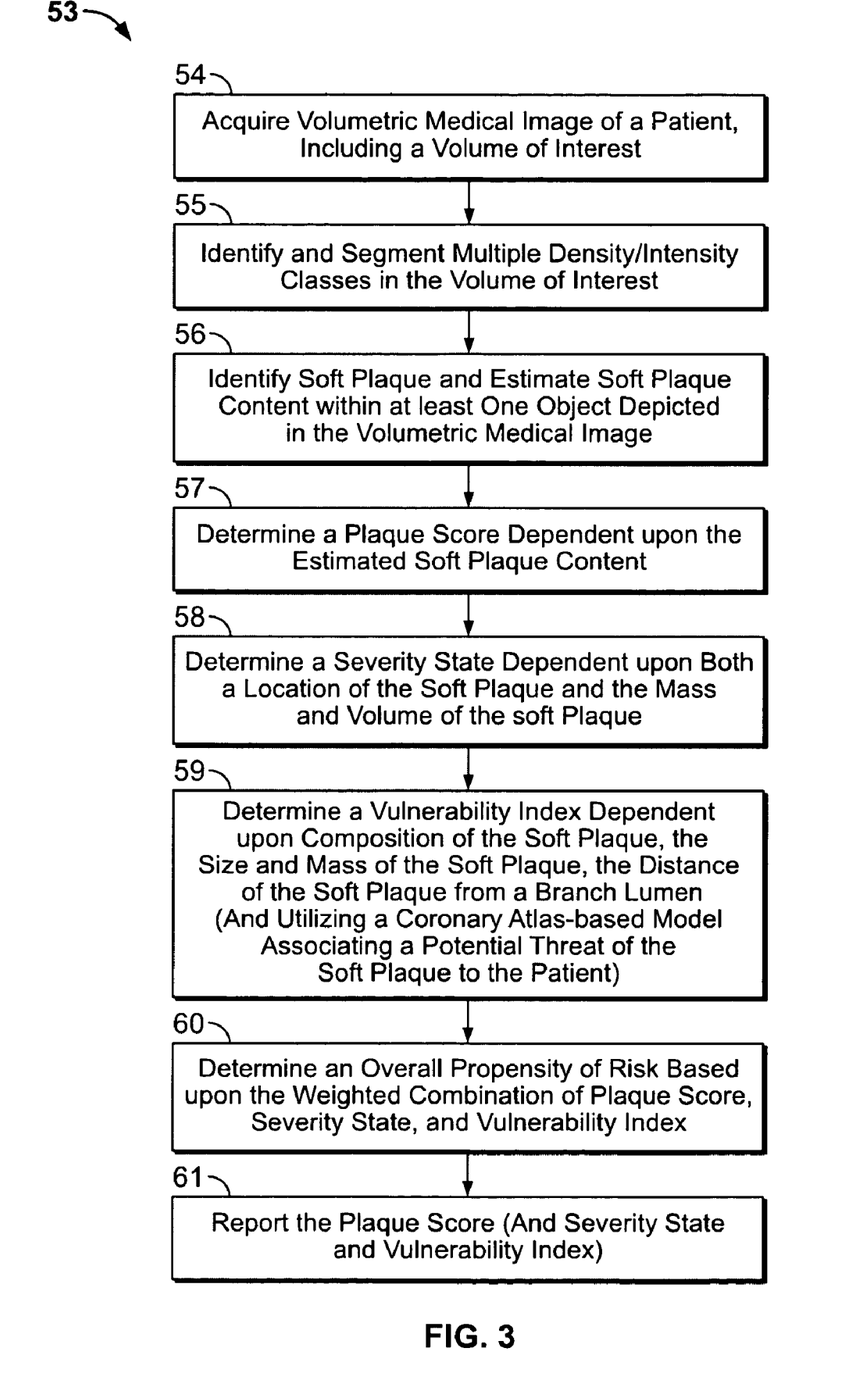
FIG. 3 is a flow chart representative of some configurations of the present invention, showing the determination of a plaque score (and other metrics) from an acquired volumetric image of a patient that includes a volume of interest.

Using methods described by flowchart 53 in FIG. 3 and variations described herein, it becomes possible to access coronary vessel volume, identify soft plaque, quantify the plaque content both in volume and mass, and create a score that associates the plaque content to the health of a patient's heart. Once a vessel volume of interest is created, an adaptive algorithm is run to identify regions that are calcified plaque or those that have soft plaque. A hybrid mass and volume measurement algorithm then quantifies the calcified and soft plaque. A mass and volume per vessel is reported. This is then collapsed into the total mass and the total volume of the calcified plaque and the soft plaque. A report is generated that uses the original calcium score for reporting the calcified plaque content as well as a new measure that called the soft plaque score that calculates the mass and volume of the soft plaque to compute a soft plaque score.

More particularly, some configurations of the present invention provide a method by which information concerning the state of health of a patient's organ (such as the heart) is obtained and displayed. (The term "displayed," unless further qualified, is intended to encompass both transient displays, such as display 42 of FIG. 2, and printed reports.) A volumetric medical image of a patient is obtained at 54 in flowchart 53 of FIG. 3. The volumetric image includes a volume of interest that includes an organ such as the patient's heart. (For purposes of explanation and without loss of generality, the organ of interest used throughout this description is the patient's heart.) This volumetric medical image can be obtained by a medical imaging apparatus, such as CT imaging system 10 of FIGS. 1 and 2.

Next, using the volumetric medical image and a computer, multiple density/intensity classes are identified and segmented in the volume of interest at 55. From the identified classes, soft plaque is identified at 56 and the soft plaque content estimated within at least one object (such as a vessel) depicted in the volumetric medical image. In some configurations, this soft plaque estimate includes estimates of the mass and volume of the soft plaque. Next, at 57, a plaque score that is dependent upon the estimated soft plaque content is determined. Some configurations of the present invention do not perform the procedures indicated at 58, 59, and 60, but instead proceed directly to report the plaque score at 61. However, some other configurations continue at 58 to determine a severity state that is dependent upon both a location of the soft plaque and the mass and volume of the soft plaque. In addition, in some configurations, the severity state is further dependent upon the propensity of the soft plaque to create situations that may lead to myocardial infarction (MI). Propensities for various situations may be predetermined from empirical studies or any other suitable method, and the situations recognized by computer 36 by running a pattern recognition algorithm on the soft plaque content determined in the analyzed medical image.

At this point, some configurations of the present invention proceed to 61 to report the plaque score and severity index. However, some other configurations continue at 59, where a vulnerability index is determined. The vulnerability index is dependent upon the composition of the soft plaque (which is related to the density of the plaque), the size and mass of the soft plaque, and the distance of the soft plaque from a branch vessel, which can be determined by the positions of branch vessels on the medical image being analyzed. Vulnerability indices can be predetermined from empirical studies or by any other suitable method. Some configurations of the present invention utilize a coronary atlas-based model to associate a potential threat of the soft plaque to the patient.

At this point, some configurations of the present invention skip to 61 and report the determined plaque score, severity state, and vulnerability index. However, at 60 other configurations further determine an overall propensity of risk that is based upon a weighted combination of the plaque score, severity state, and vulnerability index. The weightings used to determine the overall propensity of risk can be determined from empirical studies or any other suitable method. At 62, these configurations of the present invention can report not only the plaque score, severity state, and vulnerability index, but also the determined overall propensity of risk.

In one embodiment, the severity state determined at 58 is selected from three states of severity. Three separate threshold values are set that map the total mass and/or volume of the plaque to the severity states.

In another embodiment, the severity state determined at 58 is one of n severity states. These n severity states are assigned to plaque content dependent upon the mass and/or volume of the plaque and the location of the plaque with reference to what is distal to it and the propensity of the plaque to create situations leading to a MI.

In another embodiment, the vulnerability index determined at 59 is model based so that a priori knowledge of expected outcomes is used in a graphical sense (such as a cardiac atlas) to associate potential threat to the patient.

An overall propensity of risk can be assessed based on all the above factors in a weighted combination at 60. A plaque score can be generated separately or as a companion score to a calcification score to provide a risk measurement for heart health at 61.

Figure 4:
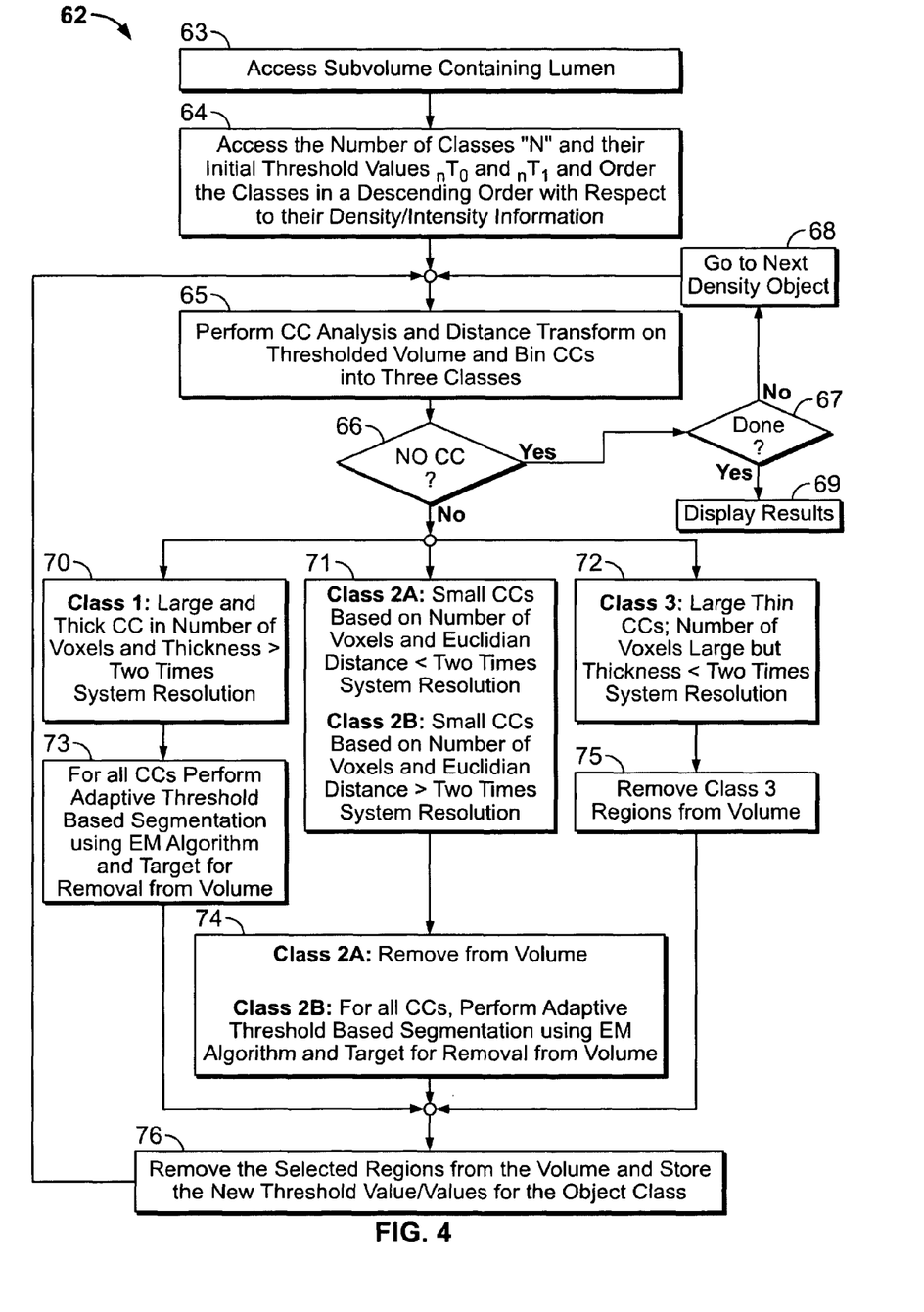
FIG. 4 is a flow chart showing one configuration of a method of the present invention by which plaque regions are located and a subvolume of the volumetric image is segmented.

Coronary artery plaque characterization performed at 55 and 56 is a special 4 class problem that can be solved by a computer algorithm illustrated in flow chart 63 of FIG. 4. The algorithm, once sufficiently understood by one of ordinary skill in the art, is readily adaptable to any number of classes separable in intensity. Flow chart 63 thus represents one configuration of the computer procedures and functions performed at both 55 and 56 of FIG. 3.

Referring to FIG. 4, at 63, a subvolume (not necessarily a proper subvolume) of a medical image is accessed containing vessel for which plaque is to be stored. This access can be performed by retrieving the contents of a memory or storage device representing the subvolume of the image. (For purposes of this description and the appended claims, accessing or using memory representing an image is considered the same as accessing or using an image.) Next, at 64, the number of classes "n" and their initial threshold values are accessed and ordered in a descending manner with respect to the density/intensity information of the classes. (Flowchart 62 represents only one embodiment of the functions and procedures performed at 55 and 56 of FIG. 3. Design choice alternatives such as ordering threshold values in an ascending manner are not described herein.)

Next, at 65, a connected component (CC) analysis is performed on voxels in the subvolume followed by a distance transform on the threshold volume and the CCs are then binned into three classes. The distance transform used in some configurations of the present invention is Euclidean, but other distance metrics, such as a chessboard metric or a city block metric can be used in other configurations of the present invention. If there are no connected components at 66, a check is performed to determine whether the procedure has been performed on all objects of interest in the subvolume at 67. If not, the next density object is readied at 68, and the analysis at 65 is repeated. If all objects of interest have been handled at 67, results may be displayed at 69, or, more importantly for the present description, fed into the procedure represented by flowchart 101, shown in FIGS. 5A and 5B.

Returning to FIG. 4, if there are CCs at 66, they are divided into classes as shown at 70, 71, and 72. Large and thick CCs in number of voxels and having a thickness (from Euclidean distance) greater then 2 times the system resolution in voxels are placed in Class 1 at 70. At 70, pruning may be performed if thin structures are connected to a CC. The pruning may be performed using opening operations. Small CC's based on the number of voxels are placed in Class 2. If the Euclidean distance is less than twice the system resolution in voxels, the CC is placed in Class 2A at 71. Otherwise, the Euclidean distance is greater than twice the system resolution in voxels, and the CC is placed in Class 2B at 71. Large thin CCs for which the number of voxels is large but the maximum Euclidean distance is less than twice system resolution are placed in Class 3 at 72. In the event the Euclidean distance is exactly twice the system resolution, a large CC may be placed arbitrarily in either Class 1 or Class 3. If a Class 2 CC has a Euclidean distance exactly equal to twice the system resolution, the Class 2 CC may be arbitrarily assigned to either Class 2A or Class 2B.

Next, at 73 (for Class 1), 74 (for Class 2A and 2B), and 75 (for Class 3), system resolution specific expectation maximization (EM) adaptive threshold based segmentation is performed for all CCs identified for Class 1 (if any), and the location of class 2 and class 3 objects are identified. Next, at 76, the objects in the current threshold volume are removed from the subvolume and one or more new threshold values are stored for the object class. From 73, the procedure continues at 65.

Figure 5A:
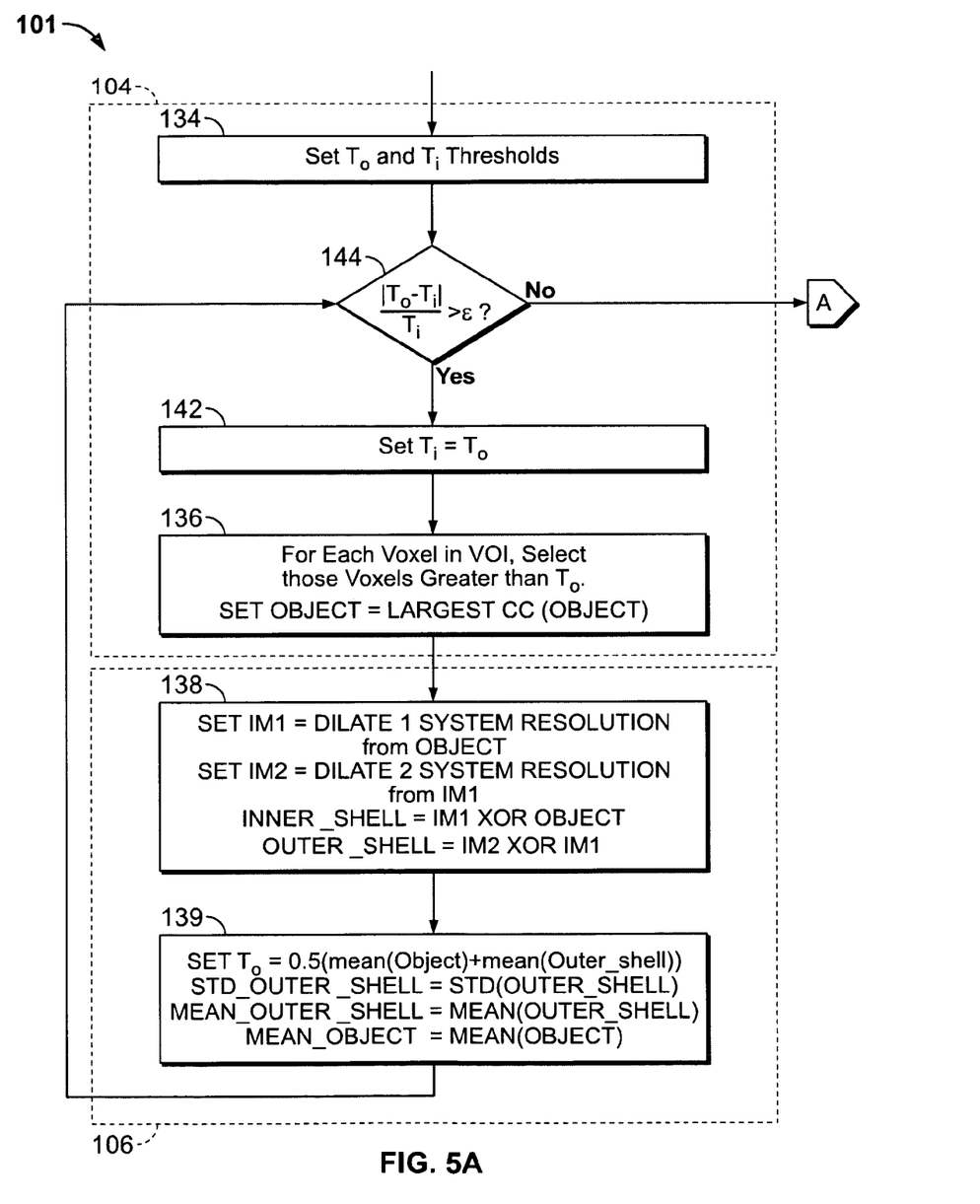
FIGS. 5A and 5B are a flow chart further detailing the determination of an interior region, a transition region, and a background region using the object boundary and a transfer function of the imaging apparatus.
Figure 5B:
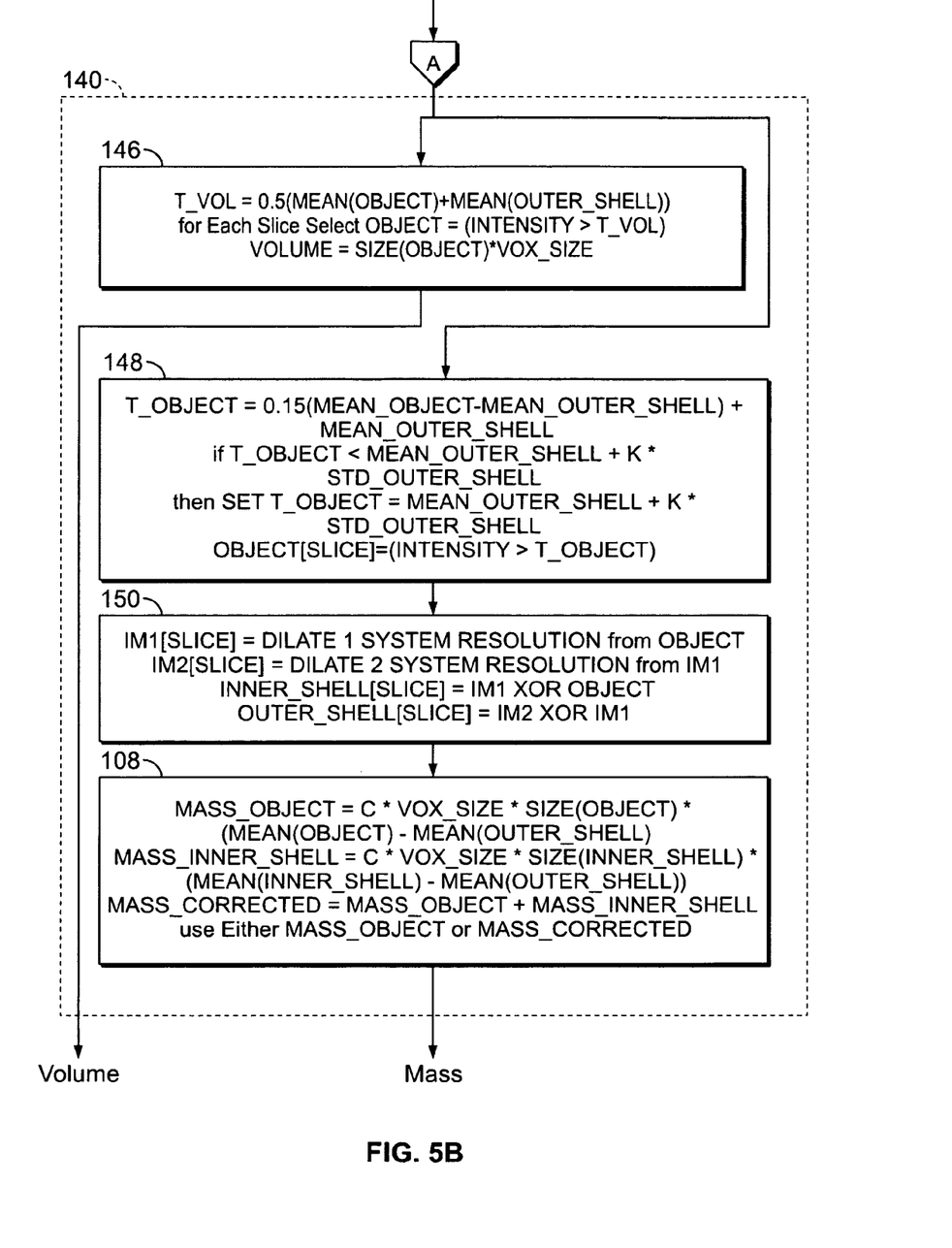

A suitable EM based segmentation algorithm is described by flowchart 101 in FIGS. 5A and 5B for all Class 1 objects at a particular threshold value. This EM based segmentation algorithm uses a value for CT system resolution. More particularly, a mean value of an immediate neighborhood of an object in the subvolume is determined to estimate the background, excluding un-measureable regions at 104. The interior, transition, and background regions are then determined, at 106, using the boundary of the object and the system transfer functions. Next, a hybrid algorithm is used to estimate the mass and/or volume of the object at 140.

In more detail, for the determination of a mean value at 104, an upper intensity threshold $T_o$ and a lower intensity threshold $T_i$ are set at 134. While excluding voxels within the region or regions of exclusion, voxels of the object (i.e., the interior of the object) in the image are determined at 136 in accordance with at least one of the upper intensity threshold or the lower intensity threshold. (An object may be darker or lighter than its surroundings, and/or the image may be a negative image.) For example, for each voxel in a volume of interest (which may include only one slice, and thus be more analogous to a region having a predetermined thickness, or which may include a plurality of slices), those voxels greater than, say, $T_o$ are determined. An object is then defined as the largest volume CC of the object defined by the voxels so determined. Next, an inner shell and an outer shell of the object is determined at 138 in accordance with the determined or defined object and the system resolution. For example, an array of voxels IM1 is determined from the object by expanding ("dilating") the object by a number of voxels equal to the system resolution. For example, if the system resolution is one voxel, IM1 represents a collection of voxels including the object voxels plus all of the voxels one voxel distant from the object voxels. If the system resolution were two voxels, IM1 would be dilated 2 voxels in this configuration. Also, IM2 represents an array dilated twice the system resolution from IM1. (The dilation factor of two system resolutions for IM2 is suitable for many applications in which lesions or calcifications are to be quantified, but other dilation factors for either or both IM1 and IM2 can be determined empirically in other configurations or for other purposes.) The inner shell of the object is determined by excluding (XORing) the set (not the values) of voxels in the object with the set of voxels in IM1. In other words, those voxels only in IM1 and not in the object become the voxels in the inner shell. The outer shell of the object is determined by excluding the set of voxels in IM1 with those in IM2.

Some configurations of the present invention then reset one or more of the thresholds in preparation for another iteration to further refine the object, the inner shell, and the outer shell. More particularly, in the represented configuration, one of the threshold values is reset using a value written as:

$$T_o=0.5(\text{mean(Object)}+\text{mean(Outer\_shell)}),$$

where the means are taken of the intensities of the voxels in the object and in the outer shell of the object. Means and standard deviations (STD) are also determined in some configurations for later use:

$$\text{STD\_OUTER\_SHELL}=\text{STD(OUTER\_SHELL)}$$

$$\text{MEAN\_OUTER\_SHELL}=\text{MEAN(OUTER\_SHELL)}$$

$$\text{MEAN\_OBJECT}=\text{MEAN(OBJECT)}$$

where the respective functions are functions of the intensities of the voxels within the outer shell and/or the object.

Also, some configurations provide a measure or of at least one of mass (at 148, 150, and 108) or volume (at 110) of the object in the image utilizing the intensities of the determined inner shell or of the determined outer shell to determine the provided estimate.

In some configurations, the upper and/or lower thresholds are adjusted at 139 and 142, and 136 and 138 are repeated until an accuracy test at 144 is satisfied.

In various configurations in which a volume estimate is provided, providing the volume estimate comprises utilizing, at 146, voxels of the object and determining the volume of the object in accordance with the number of voxels in the determined volume of the object and a size of each voxel. More particularly, in some configurations, a variable T_VOL is determined by a relationship written as:

$$T\_VOL=0.5(\text{MEAN(OBJECT)}+\text{MEAN(OUTER\_SHELL)}),$$

where the mean functions are taken over the intensities of the voxels in the object and the outer shell. Then, for each slice (in a multislice or 3-D system), the object is selected from those voxels having an intensity greater than T_VOL. (In cases in which the object appears darker than the surroundings, or in case a negative image is used in which the object appears darker than the surroundings, those voxels having a lesser intensity are selected.) The estimate of the volume is equal to the size of the object (in number of voxels meeting the intensity criteria) times the size (volume) of a voxel.

In various configurations in which a mass estimate is provided, providing the mass estimate comprises determining at 148 an adjusted interior region of the object. Also, an adjusted inner shell of the object is determined at 150 in accordance with the size of the object. A mass of the object is determined at 108 in accordance with the size of each voxel, the size of the adjusted interior region of the object, and a difference between representative intensities of the adjusted interior region of the object and of the adjusted outer shell of the object.

More specifically, in some configurations, a variable T_OBJECT is defined as a function of mean intensities of the object and its outer shell. For example, using the 15% (0.15) point on the slope of the transition to the object interior will capture most of the densities of the object without including excessive noise, (which can be adjusted in other configurations), $$T\_OBJECT=0.15*(\text{MEAN\_OBJECT}-\text{MEAN\_OUTER\_SHELL})+\text{MEAN\_OUTER\_SHELL}$$

Next, the following test is performed, using a parameter K which can be determined empirically, and if the test succeeds, T_OBJECT is set to another value as a function of the intensities of the mean outer shell and the standard deviation of the outer shell:

$$\text{IF } T\_OBJECT<\text{MEAN\_OUTER\_SHELL}+K*\text{STD\_OUTER\_SHELL}$$

$$\text{THEN SET } T\_OBJECT=\text{MEAN\_OUTER\_SHELL}+K*\text{STD\_OUTER\_SHELL}$$

Once T_OBJECT is determined, the object is defined (in each slice, in a multi-slice 3D image) as those voxels for which the intensity is greater than (or, in some configurations, less than) the value T_OBJECT.

In some configurations, providing a mass estimate also comprises determining, at 150, an adjusted inner shell of the object and an adjusted outer shell of the object, and determining, at 108, a mass of the object in accordance with the size of each voxel, the size of an adjusted interior region of the object, and a difference between representative intensities of the adjusted interior region of the object and intensities of the adjusted outer shell of the object.

More particularly in some configurations, the adjusted OBJECT[SLICE] at 148 is used to adjust the inner shell and outer shell using the relationships at 138 or similar relationships. Then, the mass of the object is determined using a relationship written:

$$\text{MASS\_OBJECT}=C*\text{VOX\_SIZE}*\text{SIZE\_OBJECT}*(\text{MEAN(OBJECT)}-\text{MEAN(OUTER\_SHELL)}),$$

where C is a constant chosen in accordance with the material of the object (e.g., a known density of the material comprising a calcification), VOX_SIZE is the volume of a voxel, SIZE_OBJECT is the size of the object (i.e., its interior region, for example, the calcification region), and the means are functions of the intensities of the voxels within the object and of the outer shell of the object.

The mass of the inner shell is determined in some configurations in accordance with a relationship written:

$$\text{MASS\_INNER\_SHELL}=C*\text{VOX\_SIZE}*\text{SIZE(INNER\_SHELL)}*(\text{MEAN(INNER\_SHELL)}-\text{MEAN(OUTER\_SHELL)}),$$

where SIZE(INNER_SHELL) is the number of voxels comprising the inner shell, and the means are intensity means of the voxels in the inner shell and the outer shell. The determined mass of the inner shell allows a corrected mass to be determined and output in some configurations of the present invention:

$$\text{MASS\_CORRECTED}=\text{MASS\_OBJECT}+\text{MASS\_INNER\_SHELL}$$

It will be understood that the "less than" test can be reversed depending upon the type of image (positive or negative) and type of object (light or dark).

Once the correct threshold values are determined the hybrid quantification algorithm calculates the mass and the volume of the objects of interest at 140.

Figure 6:
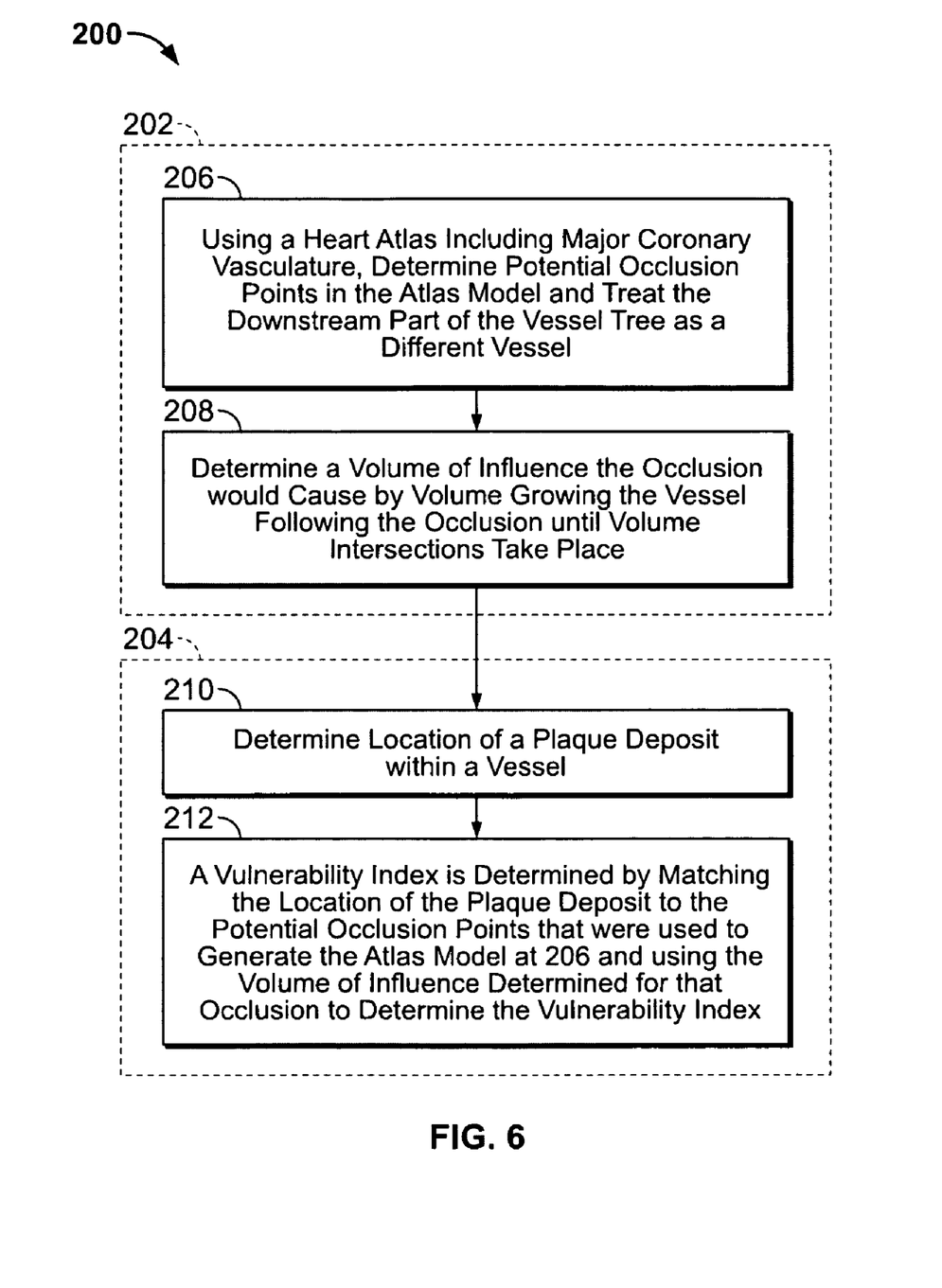
FIG. 6 is a flow chart of suitable method for constructing and using a heart atlas model in some configurations of the present invention.

Referring to FIG. 6, flow chart 200 illustrates a suitable procedure for constructing a coronary atlas-based model (at 202) from which vulnerability indices can be determined and of using the coronary atlas to determine a volume of influence the occlusion would cause (at 204). The model creation need be done only once by a manufacturer (the resulting model can be copied and provided to multiple apparatus), or refined and updated as needed.

In more detail, creation of a cardiac atlas may be based on a large number of data sets that have anatomical structures with correspondence points identified and labeled. Additionally, estimates of the impact of blockade of various vessels at various points of each vessel based on the atlas are provided.

Figure 7:
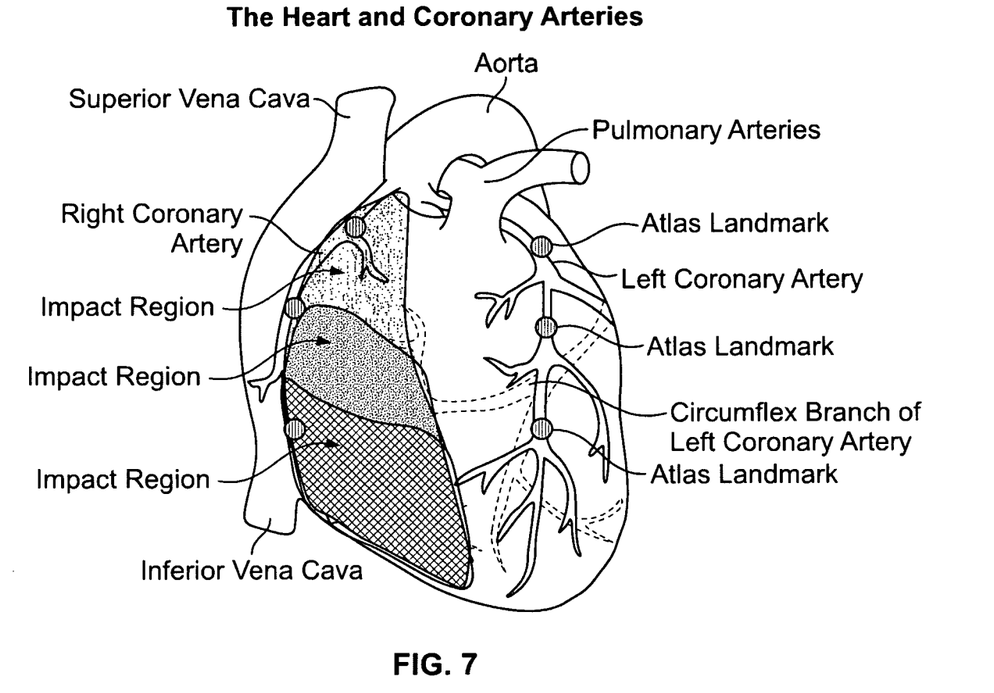
FIG. 7 is a representation of a heart atlas model showing impact regions resulting from an occlusion.
Figure 8:
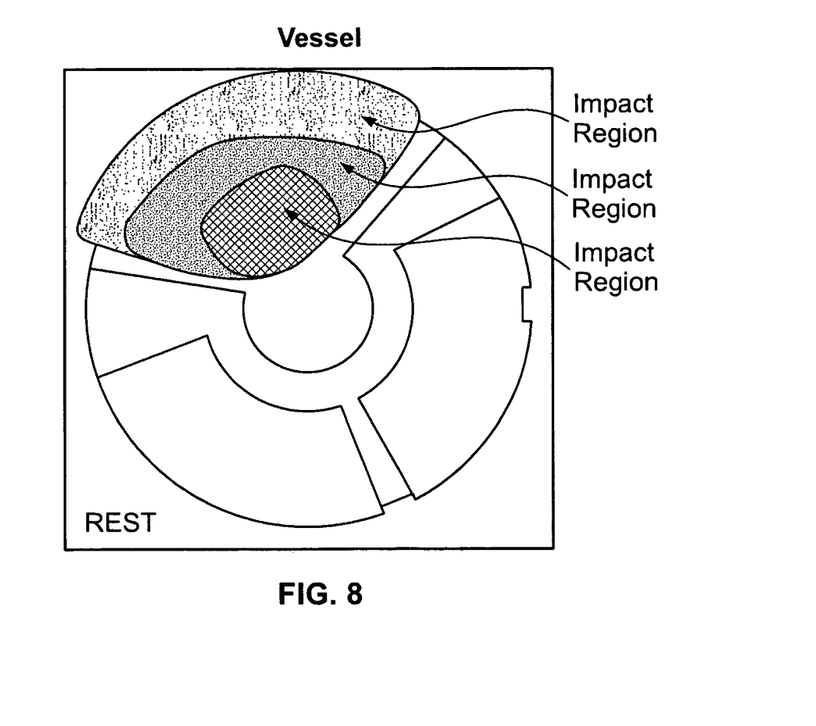
FIG. 8 is a representation of the impact regions of a vessel shown in the heart atlas model represented by FIG. 7.

For example, at 206, the creation of a heart atlas model uses a model of a heart that includes major coronary vasculature. Potential vessel occlusion points in the atlas are determined by inspection of the atlas. The downstream part of the vessel tree is then treated as if it were a different vessel. The volume of influence the blockade would cause is then determined at 208 by volume growing the vessel following the occlusion until volume intersections take place. The method used at 202 can be extended to determine effects of blockade at multiple vessels or at any part of the vascular tree. A graphical representation of the process of creating the heart model is shown in FIGS. 7 and 8.

A special case in the above analysis is the determination of affected regions in the presence of collateral vessels that are case dependent. The presence of additional collaterals can also be incorporated in this model by adding the collaterals from the present data to the atlas data and recomputing the vessel occlusion impact as before.

Data entry for an atlas database can be provided by which general geometric properties are captured automatically when possible and manually otherwise. Atlas models can be established for different patient profiles, such as patient age, weight, or sex. Atlas models that are more specific provide greater predictive capabilities.

A suitable method of using the atlas model is shown at 204. More particularly, the location of a plaque deposit within a vessel is determined at 210 using, for example, anatomical landmarks relating to the general location of the coronary arteries in the current patient to register the current patient's three dimensional dataset against a standard model of the heart and supporting vasculature. Once this initial registration is successfully done, a volume of influence that the occlusion would cause is determined at 212 by matching the plaque location to the potential occlusion points that were used to generate the atlas model at 206 and using the volume of influence determined for that occlusion to determine a vulnerability index. For example, the location of a plaque deposit within a vessel is determined, and from the model, the impact the loss of blood supply due to occlusions along the vessel distal to the current location of the plaque deposit will have on the typical heart function is determined.

While the invention has been described in terms of various specific embodiments, those skilled in the art will recognize that the invention can be practiced with modification within the spirit and scope of the claims.

What is claimed is:

1. A method for generating a score for soft plaque content in coronary arteries of a heart using a computer, said method comprising:

using the computer to generate an estimate of the soft plaque content within at least one object depicted in a medical image, the estimate including a measurement of mass of the soft plaque content;

using the computer to determine a location of the soft plaque content in the heart and a measurement of volume of the soft plaque content; and using the computer to determine a severity state representative of a health of the heart, the severity state determined based on the measurement of mass of the soft plaque content, the location of the soft plaque content, and the measurement of volume of the soft plaque content; and using the computer to report the severity state of the health of the heart.

2. The method of claim 1 wherein the estimate of the soft plaque content further includes the measurement of volume of the soft plaque.

3. The method of claim 1 wherein said severity state is further dependent upon a propensity of the soft plaque content to create a situation leading to a myocardial infarction (MI) of the heart, the propensity based on one or more empirical studies.

4. The method of claim 1 further comprising using the computer to determine a vulnerability index dependent upon a composition of the soft plaque content, the measurement of volume of the soft plaque content, the measurement of mass of the soft plaque content, and a distance of the soft plaque content from a branch vessel in the heart.

5. The method of claim 4 further wherein the vulnerability index is determined utilizing a coronary atlas-based model associating a potential threat of the soft plaque content to the heart.

6. The method of claim 5 further comprising:

using the computer to determine a soft plaque score based on the measurement of mass of the soft plaque content and the measurement of volume of the soft plaque content; and using the computer to determine an overall propensity of risk based upon a weighted combination of the plaque score, the severity state, and the vulnerability index.

7. A tangible and non-transitory machine-readable medium or media having instructions recorded thereon that are configured to instruct a computer to generate a score for soft plaque content in coronary arteries, the instructions comprising instructions configured to instruct the computer to:

generate an estimate of the soft plaque content within a heart depicted in a medical image, the estimate including a measurement of mass of the soft plaque content;

determine a location of the soft plaque content and a measurement of volume of the soft plaque content in the heart;

determine a severity state representative of a health of the heart, the severity state determined based on the measurement of mass of the soft plaque content, the location of the soft plaque content, and the measurement of volume of the soft plaque content; and report the severity state of the health of the heart.

8. The medium or media of claim 7 wherein the estimate of the soft plaque content further includes the measurement of volume of the soft plaque content.

9. The medium or media of claim 7 wherein said severity state is further dependent upon a propensity of the soft plaque content to create a situation leading to a myocardial infarction (MI) of the heart, the propensity based on one or more empirical studies.

10. The medium or media of claim 7 wherein the instructions instruct the computer to determine a vulnerability index dependent upon a composition of the soft plaque content, the measurement of volume of the soft plaque content, the measurement of mass of the soft plaque content, and a distance of the soft plaque content from a branch vessel in the heart.

11. The medium or media of claim 10 wherein said instructions instruct the computer to use a coronary atlas-based model associating a potential threat of the soft plaque content to the heart to determine the vulnerability index.

12. The medium or media of claim 11 wherein the instructions instruct the computer to:
   determine a soft plaque score based on the measurement of mass of the soft plaque content and the measurement of volume of the soft plaque content; and
   determine an overall propensity of risk based upon a weighted combination of the plaque score, the severity state, and the vulnerability index.

13. A medical imaging apparatus having a radiation source, a detector array, an image processor, a display, and a memory, said medical imaging apparatus controlled by a computer configured to operate the medical imaging apparatus to produce medical images using the radiation source, the detector array, the image processor, the display, and the memory, and the memory having stored therein instructions configured to instruct the computer to generate a score for soft plaque content in coronary arteries, said instructions comprising instructions configured to instruct the computer to:
   generate an estimate of the soft plaque content within a heart depicted in a medical image, the estimate including a measurement of mass of the soft plaque content;
   determine a location of the soft plaque content and a measurement of volume of the soft plaque content in the heart;
   determine a severity state representative of a health of the heart, the severity state determined based on the measurement of mass of the soft plaque content, the location of the soft plaque content, and the measurement of volume of the soft plaque content; and
   report the severity state of the health of the heart.

14. The apparatus of claim 13 wherein the estimate of the soft plaque content further includes the measurement of volume of the soft plaque content.

15. The apparatus of claim 13 wherein said severity state is further dependent upon a propensity of the soft plaque content to create a situation leading to a myocardial infarction (MI) of the heart, the propensity based on one or more empirical studies.

16. The apparatus of claim 13 wherein the instructions instruct the computer to determine a vulnerability index that is dependent upon a composition of the soft plaque content, the measurement of volume of the soft plaque content, the measurement of mass of the soft plaque content, and a distance of the soft plaque content from a branch vessel in the heart.

17. The apparatus of claim 16 wherein said instructions instruct the computer to use a coronary atlas-based model associating a potential threat of the soft plaque content to the heart to determine the vulnerability index.

18. The apparatus of claim 17 wherein said instructions instruct the computer to:
   determine a soft plaque score based on the measurement of mass of the soft plaque content and the measurement of volume of the soft plaque content; and
   determine an overall propensity of risk based upon a weighted combination of the plaque score, the severity state, and the vulnerability index.

* * * * *